United States Patent [19]

Reinert

[11] 4,391,228

[45] Jul. 5, 1983

[54] FALLING SHOT HEATING METHOD AND APPARATUS

[75] Inventor: A. Joe Reinert, Ponca City, Okla.

[73] Assignee: Conoco Inc., Ponca City, Okla.

[21] Appl. No.: 297,652

[22] Filed: Aug. 31, 1981

[51] Int. Cl.³ .................................................. F22B 1/02
[52] U.S. Cl. ............................. 122/28; 122/367 PF; 165/104.17
[58] Field of Search ................. 122/28, 31 R, 367 PF; 165/104.17

[56] References Cited

U.S. PATENT DOCUMENTS 1,152,898 9/1915 McKee .................................. 122/28

OTHER PUBLICATIONS

Shaw et al., *A New Method of Efficient Heat Transfer and Storage at Very High Temperatures;* 8-1980.

*Primary Examiner*—Edward G. Favors
*Attorney, Agent, or Firm*—Richard W. Collins

[57] ABSTRACT

Process and apparatus for the heating of fluids by heat exchange with falling shot particles. A heat-transfer medium is heated to a temperature above its melting point to produce a body of molten heat-transfer medium at an elevation above a fluid heating zone. The molten medium is sparged downardly into the heating zone where it contacts fluid therein. The molten medium is solidified to form shot particles and the aqueous fluid in contact therewith is heated. The resulting steam or hot water is recovered from the heating zone and the relatively cool shot particles are recovered from the heating zone and recirculated for heating to produce molten heat-transfer medium as described above. The heat-transfer medium may take the form of heavy metals such as lead and lead alloys. Where hard water is used as the feed to the heating zone, the resulting scale deposits are recovered with the shot particles and then separated therefrom prior to recirculating the shot particles for melting to form the molten heat-transfer medium.

15 Claims, 2 Drawing Figures

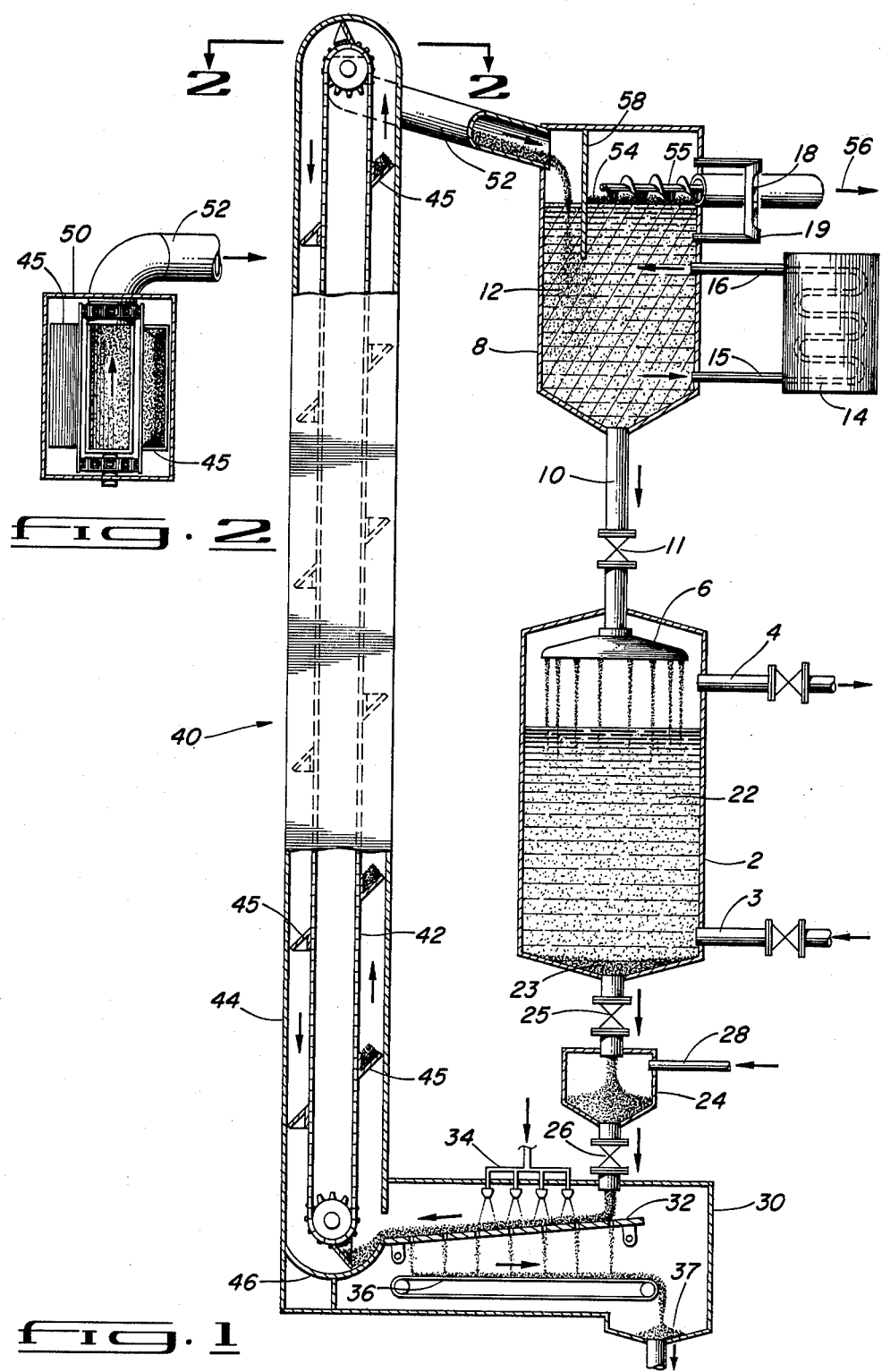

FALLING SHOT HEATING METHOD AND APPARATUS

TECHNICAL FIELD

This invention relates to fluid heating systems and processes and more particularly to the heating of fluids by the solidification of a molten heat exchange medium to form falling shot particles.

BACKGROUND OF INVENTION

There are many industrial processes involving the heating of water to high temperatures. For example, in the oil industry, it is a conventional practice to generate steam and/or hot water from produced oil field waters and inject the resulting steam or water into a subterranean formation in the course of a thermal oil recovery procedure. Various other applications involve the generation of steam or hot water for heating or power generating purposes or in distillation techniques such as the conversion of brine to potable water. In many cases, the feed water is a hard water containing divalent metal ions which form water insoluble precipitates, commonly referred to as "scale." The presence of scale forming constituents in feed waters is particularly troublesome in steam generation plants in which scale deposits on heat exchange surfaces, pipes, etc. can accumulate very rapidly. Most steam generation techniques require the use of good quality feed water in order to prevent the formation of scale on heat exchange tubes and the like. Thus, it is a conventional practice to pretreat boiler feed waters and other waters to be heated by techniques such as filtration, ion exchange, flotation, sedimentation, and the like to remove dissolved and suspended solids.

The chemical reactions which result in the precipitation of scale forming compounds are accelerated by heat and in some cases this fact is utilized to advantage. For example, U.S. Pat. No. 3,510,796 to Hull discloses the heating of boiler feed water with steam to precipitate divalent metal ions as calcium carbonate, magnesium hydroxide, magnesium silicate, calcium sulfate, and barium sulfate.

Other techniques involve the use of solid, particulate heat exchange materials. For example, U.S. Pat. No. 3,242,975 to Kogan discloses a heat exchanger of the pebble type which is said to be particularly useful in the conversion of sea water to potable water. In this system, heat exchange particles or "pebbles" are heated in an upper pebble chamber and then passed downwardly into a second heating chamber where they move in countercurrent flow with a cold brine which is introduced into the heating chamber at the bottom thereof. The heat loss from the hot pellets heats the brine to a suitable temperature; e.g., 215° F. The now relatively cool pebbles are withdrawn from the heating chamber and conveyed by means of an elevator conveyor upwardly to the first pebble chamber where they are reheated.

Other water heating techniques involving the use of hot particulate materials are disclosed in U.S. Pat. Nos. 3,335,083 and 3,376,204 to Tidball. In these procedures, a liquified heat-transfer medium such as molten metal is passed from a sparger located in the upper portion of a heating chamber through which water containing scale forming constituents is passed. As the molten metal contacts the water, it is solidifed to form shot particles which then move downwardly to the bottom of the chamber where they are collected. The aqueous liquid in the chamber is heated to a temperature of about 250° F. or higher to promote the reactions leading to the precipitation of the divalent metal ions which scale deposits. The scale precipitates tend to form on the shot particles as they fall through the water. The shot and scale deposits are removed from the heating chamber into a reservoir where the shot particles are heated to a temperature above their melting point. During this procedure the less dense scale forms a layer on the molten metal from which it is recovered and passed to a suitable disposal facility. The remelted metal is circulated by means of a pump upwardly through a conduit to the sparger where it is reintroduced into the heating vessel.

SUMMARY OF THE INVENTION

In accordance with the present invention, there is provided a new and improved process for the production of hot aqueous fluids by the falling shot technique. In carrying out the invention, the aqueous fluid to be heated is circulated into a heating zone. A heat-transfer medium is heated to a temperature above its melting point to produce molten heat-transfer medium at an elevation above the heating zone. The molten medium is then sparged downwardly through the heating zone into contact with the aqueous fluid. The sparged molten medium solidifies to form shot particles and the fluid is thus heated by the medium as it is cooled and solidified. The resulting hot aqueous fluid and the cooled shot particles are withdrawn from the heating zone. The shot particles are then recirculated for heating to produce molten heat-transfer medium as described above. In a preferred embodiment of the invention, the molten heat-transfer medium is at an elevation above the heat generation zone sufficient to produce a head greater than the gauge pressure within this zone. Preferably the heat-transfer medium is at substantially atmospheric pressure or at least under a relatively low pressure which is substantially less than the pressure developed in the heat generation zone.

In a further aspect of the invention, there is provided a new and improved system for heating by the falling shot technique. This system comprises a heating chamber having inlet and outlet means for the introduction and withdrawal of fluid and a reservoir located above the heating chamber and adapted to receive the solid heat transfer particles. The system further comprises heating means associated with the reservoir for heating particles therein for conversion to the molten state. The heating chamber is equipped with a sparging means which is in fluid communication with the reservoir and thus provides for the introduction of molten heat-transfer medium into the heating chamber from the reservoir. The heating chamber is further provided with means for removing solid heat-transfer particles from the bottom thereof. A conveyor is in communication with the particle outlet means and functions to transport the solid heat-transfer particles recovered from the heating chamber upwardly into the reservoir.

BRIEF DESCRIPTION OF THE DRAWING

FIG. 1 is an elevational view partially cut away; and
FIG. 2 is a cross-section taken through the line 2—2 of FIG. 1.

BEST MODES FOR CARRYING OUT THE INVENTION

As noted previously with respect to the above mentioned patents to Tidball, the falling shot heating technique involves the solidification of a heat-transfer medium such as molten metal to form shot particles which heat the aqueous liquid as they are solidified and cooled. The present invention provides a new and improved method and apparatus for heating by the falling shot technique. An essential feature of the invention resides in providing for heating of the shot particles to produce the molten medium at a location above the heating vessel. This feature provides a number of advantages over the prior art designs. The head of the molten metal can be employed to provide all or part of the pressure necessary to pass the liquid metal through the sparging system in to the heating zone. Thus, the circulation of the solid particles to the heating zone can be accomplished through relatively simple mechanical means without the need for high temperature pumps of the type necessary to pump the liquid metals which are commonly employed as the molten heat-transfer medium. In addition the heat-transfer medium can be under a relatively low pressure; e.g., atmospheric pressure, even though the heating vessel is operated at a relatively high pressure. This is particularly the case where the heat-transfer medium takes the form of a relatively high density metal such as lead, lead-tin alloys, and the like.

The present invention is particularly well suited to the heating of hard water such as in the generation of steam from sea water, oil-field waters, etc. Such water may have a content of divalent metal "hardness" ions, primarily calcium and magnesium, although barium might also be present, ranging from 100 ppm or less up to several thousand ppm. The scale formed on the shot particles at the elevated temperatures involved can be separated from the shot by relatively simple screening techniques prior to recirculation of the shot to the molten heating zone. This minimizes the need for skimming of scale components from the surface of the molten metal and reduces the contamination of the molten metal with scale.

Turning now to the drawing, there is shown a schematic illustration of a system which may be employed to heat an aqueous feed stream in accordance with the present invention. The system shown in the drawing is illustrated with reference to the use of the invention in the direct generation of steam from hard water. Thus, molten metal employed as the heat-transfer medium is shown as being charged directly into a steam generator. However, it will be recognized that the invention may find other applications such as in the production of hot water, the pretreatment of boiler feed water by heat as disclosed in the aforementioned patent to Hull, or in the production of a flash distillation charge as disclosed in the aforementioned patents to Tidball.

More particularly and as shown in the drawing, a feed water such as an oil-field brine is circulated into a heating vessel 2 by means of an inlet line 3 located near the bottom thereof. The heating vessel is also equipped with an outlet line 4 for the withdrawal of heated fluid, in this case steam. The heating vessel 2 is equipped with a sparger 6 located near the upper end thereof. The sparger is in fluid communication with a second vessel 8 forming the reservoir for the heat transfer medium. Thus, a conduit 10 equipped with a valve 11 provides for fluid flow from the reservoir to the sparger. The reservoir 8 contains molten metal 12 which is heated above its melting point by a heating means 14 associated with the reservoir. The heater 14 may be of any suitable type. For example, it may comprise a gas-fired furnace or a fluidized bed combustor containing a heat exchanger through which the liquid metal is circulated via lines 15 and 16 by the thermosiphon principle. Alternatively, the metal can be retained within reservoir 8 and a fluid circulated from the furnace 14 through suitable heating coils in indirect heat exchange with the metal. By way of example, a heat-transfer salt such as disclosed in the aforementioned patent to Hull can be heated in furnace or combustor 14 and circulated via lines 15 and 16 through heat exchange coils (not shown) located within the reservoir 8.

The valve 11 in the flow line to the sparger may be controlled in response to any suitable process parameter. For example, as shown in the drawing, the reservoir 8 is equipped with a liquid level sensor 18 located within a stand pipe 19. Valve 11 may be opened and closed in response to a signal from sensor 18 as necessary to maintain the liquid level within reservoir 8 substantially constant. Alternatively, the operation of valve 11 can be controlled in response to the pressure or temperature within the heating vessel 2. In any case, the molten metal flows downwardly into sparger 6. The sparger is equipped with a plurality of holes in the bottom thereof through which the hot liquid is forced into the heating zone 2. As hot droplets of molten metal contact the water within the heating chamber, they are solidified to form shot particles indicated by reference numeral 22, which fall through the water and accumulate in the bottom of the chamber as indicated by reference numeral 23. The water (and steam) within the chamber is heated by heat transfer due to the temperature gradient between the metal and the water and also the heat transfer due to the latent heat of solidification of the metal, and the resulting steam is withdrawn via line 4.

The shot accumulated in the bottom of the vessel is withdrawn either intermittently or continuously through a low pressure trap system comprising a lock chamber 24 and valves 25 and 26. The trap is operated by opening valve 25 to force shot and scale accumulated at the bottom of the heating vessel into the lock vessel 24. Thereafter valve 25 is closed and valve 26 is opened to withdraw the shot and scale from the lock chamber. Normally the pressure differential across valve 26 will be adequate to force the shot and scale particles from the chamber 24. However, chamber 24 also is equipped with a line 28 through which a suitable flushing liquid can be introduced as desired.

The effluent from chamber 24 is passed into a separator 30 may be of any suitable type and in the embodiment shown comprises a reciprocating screen 32 upon which the shot-scale mixture falls as it enters the separator. As the screen is reciprocated, wash water reciprocating from sprinkler heads 34 washes the scale through the reciprocating screen onto an endless conveyor belt 36. The scale falls off the conveyor into a hopper 37 from which it may be withdrawn and disposed of. The reciprocating screen has openings of a size such that the screen will retain the shot while passing a significant portion of the scale. The maximum size of openings in the screen, dependent on the shot size, will vary depending on variables such as the differential pressure forcing the molten metal through the sparger and the size and design of the holes in the sparger, but mostly on the size of the holes in the sparger. Such maximum size can be readily calculated by those skilled in the art, or determined by simple experiment not amounting invention. As the screen 32 is reciprocated, the shot particles are fed by gravity to elevator 40 which functions to transport them upwardly to the reservoir 8. Other means of transport such as a slurry system can also be employed. The elevator in the embodiment shown takes the form of an endless conveyor belt 42 mounted within a housing 44. Belt 42 is equipped with bucket elements 45 which function to scoop the shot particles from a loading receptacle 46. The shot particles are transported upwardly with the ascending flight of the conveyor belt. The bucket elements are slanted downwardly toward the wall 50 of housing 44. As each bucket reaches the top of the elevator, its contents are dumped onto an inlet ramp 52 where they flow by gravity into the reservoir 8.

As the shot particles enter the molten metal reservoir, they are melted and any scale retained thereon ultimately floats to the top of the molten metal where it forms a layer as indicated by reference numeral 54. A skimming mechanism 55 is operated to remove the accumulated scale which is then conveyed to a suitable disposal zone as indicated by arrow 56. By way of example, the skimming mechanism may take the form of a screw conveyor connected to a scale receiving vessel (not shown) such as disclosed in the aforementioned patents to Tidball. The skimmer is operated in conjunction with the level controller so that only scale floating on the top of the molten metal is removed. The vessel 8 is also equipped with a baffle 58 between the skimmer and the point of entry of the shot particles in order to avoid agitation of the scale slag floating on the surface of the liquid metal.

The skimmer 55 can be operated manually, by a timer at periodic intervals, or in response to the thickness of the accumulated slag floating over the surface of the liquid metal. For example, reservoir 8 may be equipped with a second level sensor (not shown) located above sensor 18 and responsive to the slag layer. Thus, as the slag layer accumulates to a predetermined depth, the second level sensor produces a control function which acts to operate the skimmer for a period sufficient to remove most of the accumulated slag.

The separator 30, elevator housing 40, ramp 52, and chamber 8 form a closed system which can be placed under pressure in the event it is necessary to the operation of the sparger. In many cases, this will not be necessary and the system can be operated at atmospheric pressure. This mode of operation is preferred. In any event, the separator-conveyor system can be operated under a relatively low pressure which is substantially less than the pressure developed in the heat generation zone. This greatly simplifies design requirements for seals around moving parts.

The pressure requirements will be determined by the system configuration and the density of the heat-transfer medium. Preferably the heat-transfer medium is a relatively heavy metal having a specific gravity greater than that of the liquid in vessel 2. The medium can be a material that solidifies above the boiling point of the liquid in vessel 2, is of a greater density than the liquid in vessel 2, is substantially completely insoluble in the liquid in vessel 2, and is substantially completely non-reactive with the liquid in vessel 2, at the conditions prevailing therein. Especially suitable are lead and lead alloys which range in density from about 9 to 11.4 and which exhibit melting points within the range of 225° to 330° C. As an example of the operating parameters of the present invention, the heating zone 2 is operated to generate steam at a temperature of 275° F. (135° C.) and a gauge pressure of 30 pounds per square inch. The heat-transfer medium is antimonial lead having a specific gravity of 11 and a melting point within the range of 245°–290° C. The head gradient of the molten metal is about 4.7 psi/ft. The system dimensions are about 5 feet from the sparger to the bottom of chamber 8 and another 5 feet to the top of the liquid within the chamber resulting in a liquid head on the sparger of 10 feet or 47 psi. In this case, the system can comfortably be operated at atmospheric pressure. On the other hand, if it were desired to operate the steam generator at a significantly higher pressure; e.g., 60 psig, it would be necessary to impose a moderate pressure upon the reservoir 8 and the attendant portion of the system extending to separator 30.

In view of the foregoing description, it can be seen that the present invention offers a number of improvements over conventional falling shot heating systems such as are disclosed in the aforementioned patents to Tidball. In the present invention, the molten metal, prior to being directed to the sparger, is in a relatively compact mass within the reservoir 8, thus providing relatively good efficiency in terms of heat loss. Therefore, the present invention provides for less heat loss than in the case of the prior art where the molten metal is circulated through a relatively long conduit to the sparging system. It is also readily circulatable through heat extractive means of advanced combustors such as fluidized bed combustion systems. The invention also avoids problems which may be associated with directly transferring the shot from the steam generating chamber downwardly into a molten metal bath. In that mode of operation, water may also be removed with the shot and form steam as it comes into contact with the molten metal. The present invention avoids problems of this nature. If some small amounts of water are associated with the shot particles as they enter reservoir 8, the resulting steam can be readily disposed of, particularly in the preferred case where the reservoir is operated at atmospheric pressure or at least under a relatively low gauge pressure.

In the preferred embodiment illustrated, most of the scale and any liquid withdrawn with the shot is separated from the shot prior to transferring the shot to the elevator system. However, the entire mixture can be taken to an elevation above the heating zone; e.g., by hydraulic means or by mechanical means of the type shown, and separation of the undesirable components then accomplished at that level. The heavy shot particles can then be returned to a molten metal reservoir by gravity feed. Also, while usually preferred, it is not necessary that a scale separation step be employed prior to transferring the shot particles to the molten metal reservoir. Thus, the shot and scale mixture, together with brine and sludge, can be charged to the molten metal heating vessel without prior separation. Particularly in the case where the reservoir is operated at atmospheric or near atmospheric pressure, any water present can be readily blown off as steam. Also in this case, as well as in the preferred embodiment shown, the operation of the molten metal reservoir at atmospheric or near atmospheric pressure enables operation of the skimmer mechanism to remove scale from the metal surface without the need for high pressure seals and the vessels.

The heat generation zone 2 can be operated at any suitable temperature and pressure to produce steam or hot water as desired. The temperature within zone 2 can be controlled by controlling the feed water rate through line 3, the recirculation rate of heat-transfer medium to the sparger, the temperature to which the heat-transfer medium is raised, or by a combination of these conditions.

Having described specific embodiments of the present invention, it will be understood that modifications thereof may be suggested to those skilled in the art, and it is intended to cover all such modifications as fall within the scope of the appended claims.

I claim:

1. A process for the heating of an aqueous fluid comprising:
   (a) circulating an aqueous fluid into a heating zone;
   (b) heating a heat-transfer medium to a temperature above its melting point to produce molten heat-transfer medium at an elevation above said heating zone and establishing a reservoir of said molten heat-transfer medium above said heating zone;
   (c) sparging said molten medium downwardly through said heating zone whereby the sparged molten medium solidifies to form shot particles and said fluid is heated by said medium as it is cooled and solidified;
   (d) recovering hot aqueous fluid from said heating zone;
   (e) recovering cooled shot particles from said heating zone; and
   (f) recirculating said shot particles and heating said shot particles to produce molten heat-trasfer medium in accordance with step (b).

2. The process of claim 1 wherein said said heat-transfer medium has a density greater than the density of said aqueous fluid, solidifies at a temperature above the boiling point of said aqueous fluid, and is insoluble in and non-reactive with said aqueous fluid.

3. The process of claim 1 wherein said heat-transfer medium has a specific gravity of from 9 to 11.4 and a melting point of from 225° to 330° C.

4. The process of claim 1 wherein said heat-transfer medium is selected from the group consisting of lead and lead alloys having a specific gravity of from 9 to 11.4.

5. The process of claim 1 wherein said heat-transfer medium is antimonial lead having a specific gravity of 11 and a melting point in the range of 245° to 290° C.

6. The process of claim 1 wherein said molten heat-transfer medium is at an elevation above said heating zone sufficient to produce a head greater than the gauge pressure within said heating zone.

7. The process of claim 1 wherein said molten heat-transfer medium is maintained under a pressure which is substantially less than the pressure in said heating zone.

8. The process of claim 7 wherein said molten heat-transfer medium is at atmospheric pressure.

9. A process for heating of an aqueous fluid comprising:
   (a) circulating hard water containing divalent metal ions into a heating zone;
   (b) heating a heat-transfer medium to a temperature above its melting point to produce molten heat-transfer medium at an elevation above said heating zone;
   (c) sparging said molten medium downwardly through said heating zone whereby the sparged molten medium solidifies to form shot particles and said water is heated by said medium as it is cooled and solidified to a temperature sufficient to precipitate a substantial portion of said divalent metal ions as scale in said heating zone;
   (d) recovering hot aqueous fluid from said heating zone;
   (e) recovering cooled shot particles from said heating zone;
   (f) removing said scale from said heating zone in admixture with said shot particles; and
   (g) recirculating said shot particles for heating to produce molten heat-transfer medium in accordance with step (b).

10. The process of claim 9 further comprising circulating at least a portion of said scale with said shot particles in accordance with step (f) of claim 1 to produce molten heat-transfer medium whereby said scale floats on the surface of said medium, and removing said scale from the surface of said molten medium.

11. The process of claim 9 further comprising separating at least a portion of said scale from said shot particles prior to recirculating said shot in accordance with step (f) of claim 1.

12. The process of claim 11 further comprising the step of circulating a second portion of said scale with said shot particles in accordance with step (f) of claim 1 to produce molten heat-transfer medium whereby said scale floats on the surface of said medium, and removing said scale from the surface of said molten medium.

13. The process of claim 12 wherein said heat-transfer medium is heated by a fluidized bed combustor.

14. In a falling shot fluid heating system, the combination comprising:
   (a) a heating chamber having inlet means for the introduction of fluid and outlet means for the withdrawal of fluid;
   (b) a reservoir located above said heating chamber and adapted to receive solid heat-transfer particles;
   (c) heating means associated with said reservoir for heating particles therein for conversion to the molten state;
   (d) sparging means in said heating chamber and in fluid communication with said reservoir for introducing molten heat-transfer medium from said reservoir into said heating chamber;
   (e) second outlet means for removing solid heat-transfer particles from the bottom of said heating chamber; and
   (f) conveyor means communicating with said second outlet means for transporting solid heat-transfer particles recovered from said heating chamber upwardly to said reservoir.

15. The system of claim 14 further comprising separating means interposed between said second outlet means and said conveyor means for separating hard-water scale deposits from said heat-transfer particles and delivering said heat-transfer particles to said conveyor means.

* * * * *